(12) United States Patent
Wang et al.

(10) Patent No.: US 7,726,575 B2
(45) Date of Patent: Jun. 1, 2010

(54) INDICIA READING TERMINAL HAVING SPATIAL MEASUREMENT FUNCTIONALITY

(75) Inventors: Ynjiun P. Wang, Cupertino, CA (US); Kevin Ahearn, Matthews, NC (US); Stephen P. Deloge, Palmyra, NY (US); Michael A. Ehrhart, Liverpool, NY (US); William H. Havens, Syracuse, NY (US); Robert M. Hussey, Camillus, NY (US); Thomas J. Koziol, Camillus, NY (US); Jianhua Li, Fremont, CA (US); Jingquan Li, Auburn, NY (US); James Montoro, Middletown Springs, VT (US); Sven M. A. Powilleit, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 109 days.

(21) Appl. No.: 11/891,633

(22) Filed: Aug. 10, 2007

(65) Prior Publication Data

US 2009/0039167 A1  Feb. 12, 2009

(51) Int. Cl.
*G06K 7/10* (2006.01)
*G06K 9/22* (2006.01)

(52) U.S. Cl. ............ 235/462.42; 235/462.45; 235/462.2

(58) Field of Classification Search ......... 235/462.42, 235/462, 45; 356/627; 702/127, 155; 382/286
See application file for complete search history.

(56) References Cited

U.S. PATENT DOCUMENTS

| | | | |
|---|---|---|---|
| 3,671,766 A | 6/1972 | Howe | |
| 3,947,816 A | 3/1976 | Rabedeau | |
| 4,044,283 A | 8/1977 | Allison | |
| 4,063,287 A | 12/1977 | Van Rosmalen et al. | |
| 4,333,006 A | 6/1982 | Gorin et al. | |
| 4,387,297 A | 6/1983 | Swartz et al. | |
| 4,580,894 A | 4/1986 | Wojcik | |
| 4,632,501 A | 12/1986 | Glynn | |
| 4,717,241 A | 1/1988 | Aagano et al. | |
| 4,730,190 A * | 3/1988 | Win et al. | 342/118 |
| 4,904,034 A | 2/1990 | Narayan et al. | |
| 4,958,894 A | 9/1990 | Khowles | |
| 5,076,690 A | 12/1991 | deVos et al. | |
| 5,080,456 A | 1/1992 | Katz et al. | |
| 5,168,149 A | 12/1992 | Dvorkis et al. | |
| 5,193,120 A | 3/1993 | Gamache et al. | |
| 5,220,536 A | 6/1993 | Stringer et al. | |
| 5,224,088 A | 6/1993 | Atiya et al. | |
| 5,280,165 A | 1/1994 | Dvorkis et al. | |
| 5,329,103 A | 7/1994 | Rando | |
| 5,331,118 A | 7/1994 | Jensen | |
| 5,373,148 A | 12/1994 | Dvorkis et al. | |
| 5,412,198 A | 5/1995 | Dvorkis | |

(Continued)

*Primary Examiner*—Michael G Lee
*Assistant Examiner*—Keith Goodman, Jr.
(74) *Attorney, Agent, or Firm*—Marjama Muldoon Blasiak & Sullivan LLP

(57) ABSTRACT

There is provided in one embodiment an indicia reading terminal that can execute a spatial measurement mode of operation in which the indicia reading terminal can determine a dimension of an article in a field of view of the indicia reading terminal and/or determine other spatial information. In determining a dimension of an article, an indicia reading terminal can utilize setup data determined in a setup mode of operation and/or data determined utilizing the setup data.

29 Claims, 7 Drawing Sheets

U.S. PATENT DOCUMENTS

| | | |
|---|---|---|
| 5,495,097 A | 2/1996 | Katz et al. |
| 5,543,610 A | 8/1996 | Bard et al. |
| 5,547,034 A | 8/1996 | Wurz et al. |
| 5,555,090 A | 9/1996 | Schmutz |
| 5,581,067 A | 12/1996 | Grosfeld et al. |
| 5,590,060 A * | 12/1996 | Granville et al. ............ 702/155 |
| 5,600,119 A | 2/1997 | Dvorkis et al. |
| 5,633,487 A | 5/1997 | Schmutz et al. |
| 5,656,799 A | 8/1997 | Ramsden et al. |
| 5,661,561 A | 8/1997 | Wurz et al. |
| 5,689,092 A | 11/1997 | Wurz et al. |
| 5,699,161 A | 12/1997 | Woodworth |
| 5,734,476 A * | 3/1998 | Dlugos ....................... 356/628 |
| 5,737,438 A | 4/1998 | Zlotnick et al. |
| 5,814,802 A | 9/1998 | Hecht et al. |
| 5,831,220 A | 11/1998 | Ramsden et al. |
| 5,831,737 A | 11/1998 | Stringer et al. |
| 5,850,370 A | 12/1998 | Stringer et al. |
| 5,869,827 A | 2/1999 | Rando |
| 5,870,220 A | 2/1999 | Migdal et al. |
| 5,889,550 A | 3/1999 | Reynolds |
| 5,900,611 A | 5/1999 | Hecht |
| 5,923,428 A | 7/1999 | Woodworth |
| 5,969,823 A | 10/1999 | Wurz et al. |
| 5,978,512 A | 11/1999 | Kim et al. |
| 5,979,760 A | 11/1999 | Freyman et al. |
| 5,984,186 A | 11/1999 | Tafoya |
| 5,991,041 A | 11/1999 | Woodworth |
| 6,049,386 A | 4/2000 | Stringer et al. |
| 6,053,409 A | 4/2000 | Brobst et al. |
| 6,064,629 A | 5/2000 | Stringer et al. |
| 6,069,696 A | 5/2000 | McQueen et al. |
| 6,123,264 A | 9/2000 | Li et al. |
| 6,137,577 A | 10/2000 | Woodworth |
| 6,147,358 A | 11/2000 | Hecht |
| 6,177,999 B1 | 1/2001 | Wurz et al. |
| 6,257,490 B1 | 7/2001 | Tafoya |
| 6,296,187 B1 | 10/2001 | Shearer |
| 6,373,579 B1 * | 4/2002 | Ober et al. ................... 356/627 |
| 6,457,642 B1 | 10/2002 | Good et al. |
| 6,517,004 B2 | 2/2003 | Good et al. |
| 6,674,904 B1 | 1/2004 | McQueen |
| 6,705,526 B1 | 3/2004 | Zhu et al. |
| 6,824,058 B2 * | 11/2004 | Patel et al. ................ 235/462.2 |
| 6,858,857 B2 * | 2/2005 | Pease et al. ............ 250/559.19 |
| 6,918,541 B2 | 7/2005 | Knowles et al. |
| 7,086,162 B2 * | 8/2006 | Tyroler ....................... 33/277 |
| 7,104,453 B1 | 9/2006 | Zhu et al. |
| 2002/0179708 A1 | 12/2002 | Zhu et al. |
| 2003/0038179 A1 | 2/2003 | Tsikos et al. |
| 2003/0053513 A1 | 3/2003 | Vatan et al. |
| 2003/0080192 A1 | 5/2003 | Tsikos et al. |
| 2003/0085281 A1 | 5/2003 | Knowles et al. |
| 2006/0086794 A1 | 4/2006 | Knowles et al. |
| 2007/0012777 A1 | 1/2007 | Tsikos et al. |
| 2007/0029390 A1 | 2/2007 | Tsikos et al. |
| 2007/0175999 A1 | 8/2007 | Tsikos et al. |
| 2007/0181685 A1 | 8/2007 | Zhu et al. |

* cited by examiner

| TYPE | w | l | h | v |
|---|---|---|---|---|
| A | 1 | 1 | 1 | 1 |
| B | 2 | 3 | 3.5 | 21 |
| C | 4 | 6 | 7 | 168 |
| D | 8 | 6.5 | 9 | 468 |
| E | 11 | 12 | 13 | 1,716 |

INDICIA READING TERMINAL HAVING SPATIAL MEASUREMENT FUNCTIONALITY

FIELD OF THE INVENTION

The present invention relates to imaging apparatuses generally and in particular, to an imaging apparatus having spatial measurement functionality.

BACKGROUND OF THE INVENTION

In the field of transportation and shipping of goods, it can be useful to perform spatial measurements with respect to packages or other objects remotely, e.g., goods that are stacked on a pallet or in the interior of a truck or shipping container. Conventional approaches for determining an object distance include approaches using a distant remote sensor or stereo vision to estimate an object distance.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
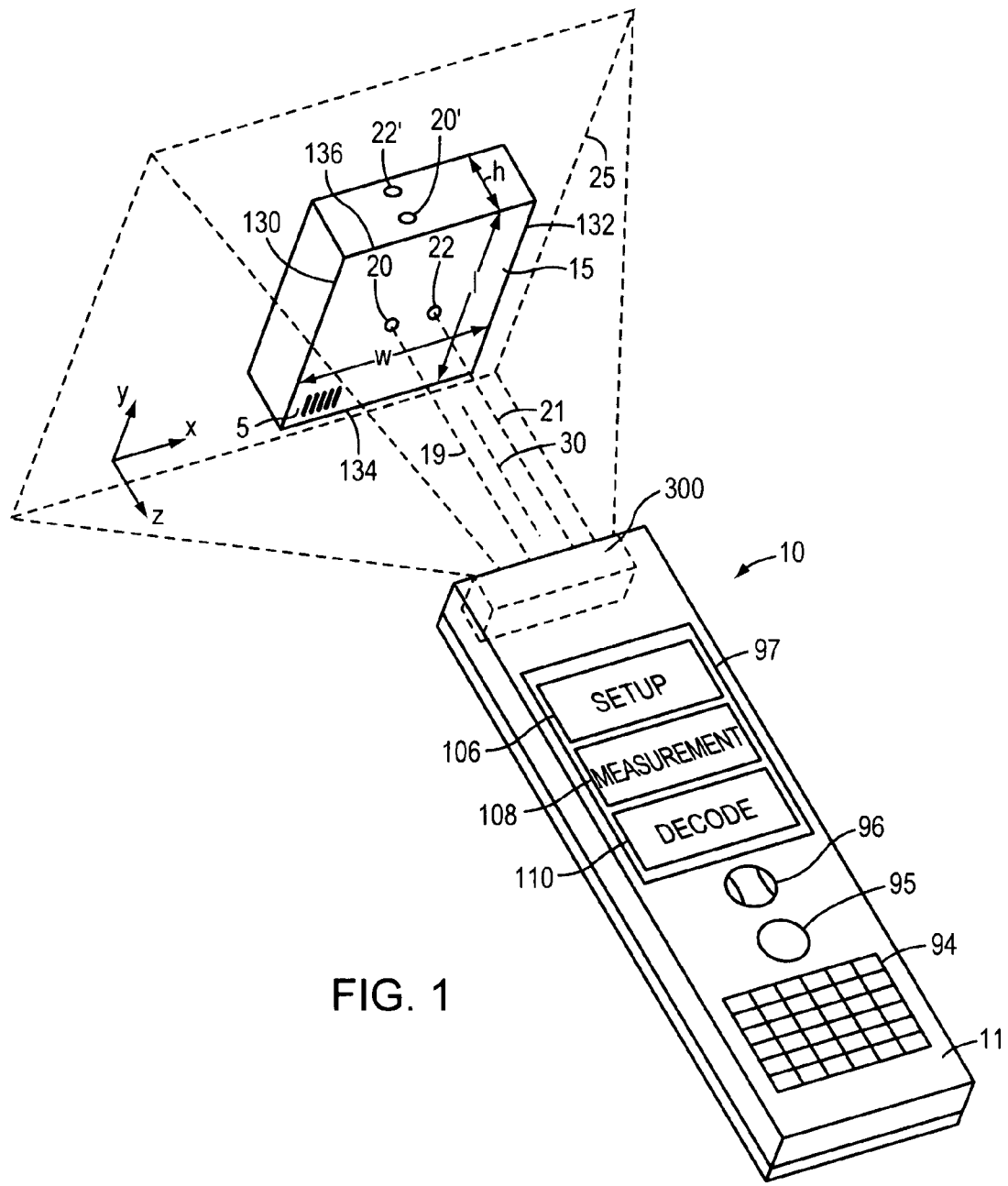
FIG. 1 is a system view showing an indicia reading terminal being used to determine a dimension of an article in a field of view of the indicia reading terminal.

There is described herein an indicia reading terminal which, in one embodiment, is operable in a setup mode in which various data is recorded as the terminal is positioned at a known distance from a target. In an "in use" mode of operation made active after the setup mode is complete, the terminal can utilize the recorded data determined in the setup mode to provide highly accurate dimension (dimensioning) measurements and other distance measurements. There is shown in FIG. 1 an indicia reading terminal according to an embodiment described herein. An indicia reading terminal can have a setup mode and one or more "in use" operating modes. The "in use" operating modes can include a spatial measurement mode in which the terminal determines spatial measurement information, e.g., a terminal to object distance, z, one or more dimensions (e.g., width, length, and/or height) of an object, such as a package, and an indicia reading mode in which the terminal decodes a message encoded in a decodable indicia. In an indicia reading mode the terminal can decode a bar code symbol to determine a decoded message corresponding to a bar code symbol.

A shipping application in which a package is subject to a delivery from one location to another is depicted in FIG. 1. In a shipping application terminal 10 might be used to read a bar code symbol 5 disposed on article 15 as well as determine at least one dimension (width and/or length and/or height) of article 15. In the specific embodiment described, article 15 is shown as being provided by a package for delivery. However, it will be understood that article 15 can be provided by any object to be subject to spatial measurement. The dimension (dimensioning) information and other measurement (e.g., volume measurement information) respecting article 15 might be used e.g., to determine a cost for shipping a package or for determining a proper arrangement of the package in a shipping container. In the specific example of FIG. 1, terminal 10 is configured to project a pair of dimensioning formations 20, 22 on a substrate such as an article 15 within a field of view 25 of terminal 10. Formations 20, 22 are regarded as dimensioning formations since frames of image data including representations of the formations can be processed for determining dimension information respecting an article.

Terminal 10 in the embodiment of FIG. 1 can be configured to determine a dimension (e.g., width, length, or height (thickness)) of article 15 by execution of a process in which terminal 10 determines a pixel distance between representations of formations 20, 22. Terminal 10 as shown in FIG. 1 can project a pair of substantially parallel laser beams 19, 21 which project light formations 20, 22 on article 15. With light formations 20, 22 being projected on article 15, terminal 10 can be actuated to capture a frame of image data having representations of light formations 20, 22. Where the actual distance between light formations 20, 22 can be estimated, a surface dimension (e.g., width) of article 15 respecting a surface can be determined by the formula:

$$D = (P_n * d_n)/p_n \qquad (\text{eq. 1})$$

where D is the dimension (e.g., width) of the package to be determined, $d_n$ is the estimated present actual distance between the formations 20, 22 on the article, $P_n$ is the pixel distance between representations of the edges of the package in the present captured frame of image data and $p_n$ is the pixel distance between the representations of formations 20, 22 in the present captured frame of image data. For finding the representations of edges, a suitable edge detection algorithm can be employed. For example, a Laplacian or Laplacian of Gaussian (LoG) filter can be applied to the captured frame of image data for detection of edges.

In one method, the distance $d_n$ (the estimated present actual distance between formations) can be a predetermined value based on design specifications for terminal 10. For example, if the beams forming light formations originate from sources that are 2 inches apart and are designed to be parallel to one another, it can be assumed that the formations will be formed at a 2 inch spacing at the package at every possible terminal to target distance. However, estimating the actual distance between formations 20, 22 based on design specifications of terminal 10 can lead to unacceptable inaccuracies in dimensioning and other spatial measurements of terminal 10 where terminal 10 deviates from the design specification significantly due to the tolerance introduced in the manufacturing process.

In one embodiment, terminal 10 can be provisioned so that the distance $d_n$, the estimated present distance between light formations 20, 22, is determined utilizing recorded setup data recorded in a setup mode of operation. With use of a setup mode according to the present description, manufacturing costs typically associated with features and steps for achieving precise alignment of one or more light sources can be avoided and yet highly precise dimensioning and other spatial measurements can be yielded.

Figure 2:
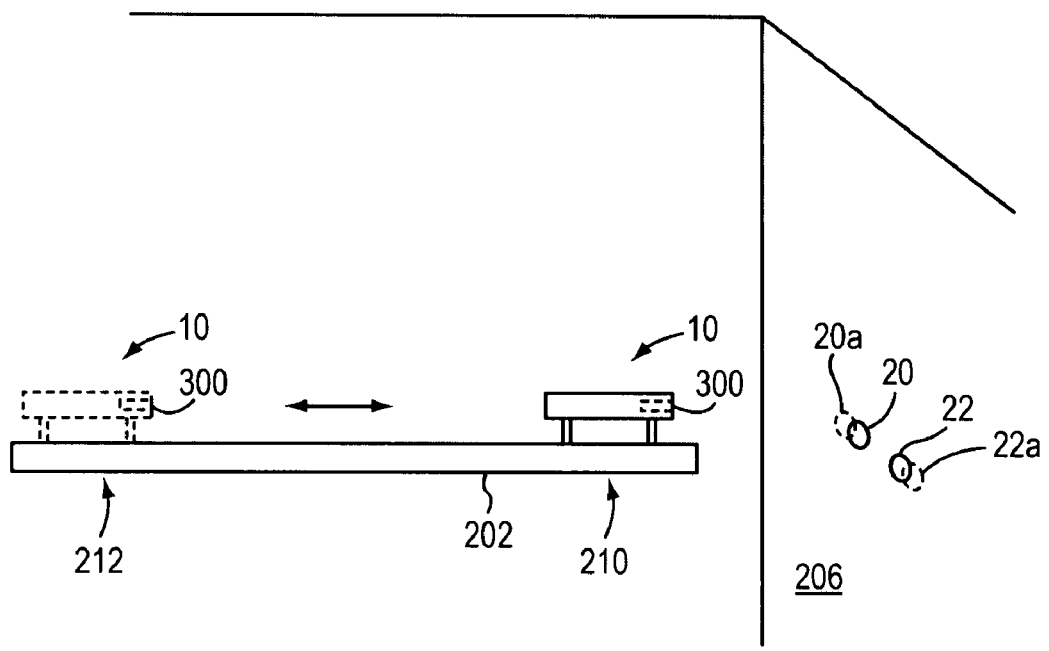
FIG. 2 is a view illustrating an exemplary embodiment of an indicia reading terminal operating in a setup mode, wherein various setup data can be recorded at various terminal to target distances.

An exemplary setup mode is described with reference to FIG. 2. In a setup mode terminal 10 can be moved between one or more reading distances to a target. In the example shown in FIG. 2, terminal 10 is shown as being mounted on a sliding fixture 202 and is slidably moveable between various distances with respect to a target substrate 206 which in the example of FIG. 2 is shown as being provided by a test room wall. At each known distance, various setup data can be recorded. In one example, terminal 10 can be moved between two terminals to target distances in a setup mode; namely, between 1 foot from a target at position 210 and 6 feet from a target at position 212. At each controlled distance, pixel positions at which formations 20, 22 are represented (e.g., the center of the representations of such formations) can be recorded, and a pixel distance value can be calculated based on the position information. The recording of pixel positions can be carried out automatically, e.g., by subjecting a frame of image data having the formations represented therein to image processing or the determining of pixel positions can be carried out manually. For example an operator setting up terminal 10 can load a captured frame of image data having representations of formations 20, 22 therein into a picture viewing program having a pixel position readout functionality and the positions can be recorded by observation. Where a pair of pixel positions is given by (x1, y1), (x2, y2), a pixel distance can be given by the formula $p=SQRT[(x2-x1)^2+(y2-y1)^2]$. Even where terminal 10 is designed to project beams 19, 21 in parallel, terminal 10, according to manufacturing tolerances may project beams 19, 21 in such manner that beams 19, 21 are not parallel. Accordingly, the position of formations 20, 22 may change as terminal 10 is moved. At a first distance (e.g., 1 foot) terminal 10 may project formations 20, 22 in the position of formations 20, 22 of FIG. 2. At a second distance (e.g., 6 feet) the terminal 10 may project formations at the position of formations 20a, 22a as shown in FIG. 2. Rather than utilizing a sliding fixture 202 in a setup mode to achieve various controlled terminal to target distances, an operator in a setup mode can maintain terminal 10 at a fixed position and can raise a target at different known distances from terminal 10. In a setup mode, terminal 10 can be in a disassembled state. For example, a setup mode can be carried out by moving imaging module 300 between various terminal to target distances prior to its incorporation into terminal housing 11. Housing 11 can be configured to be hand held so that terminal 10 when comprising housing 11 is a hand held terminal.

Indicia reading terminal 10 can be conveniently implemented with use of a single housing such as housing 11 which houses the entirety of electronic circuitry necessary for carrying out the processing described herein. However, it will be understood that terminal 10 can be implemented utilizing electrical circuitry for carrying out the processing described herein that is spread between a plurality of spaced apart locations. For example, a subset of the described processing can be carried out by electrical circuitry with a hand held housing, and a subset of the processing can be carried out by electronic circuitry within a stationary housing. In one example, the various electronic circuitry components can be in communication over an IP network.

Once a set of pixel positions and therefore pixel distances are recorded as setup data at a pair of terminal to target distances, a present terminal to target (z) distance can be determined from any measured pixel distance, $p_n$, (where $p_n$ can be measured by subjecting a frame of image data to image processing) using the formula:

$$z_n = b/(p_n - a) \qquad \text{(eq. 2)}$$

where a and b are constants solved applying linear interpolation using the set of linear interpolation formulas $p_1 = a + b/z_1$; $p_2 = a + b/z_2$, where $z_1$ is a first recorded setup mode terminal to target distance recorded as a setup data value, $z_2$ is the second recorded setup mode terminal to target distance recorded as a setup data value, $p_1$ is the recorded pixel distance at the terminal to target distance $z_1$ recorded as a setup data value, and $p_2$ is the pixel distance at the terminal to target distance $z_2$ recorded as a setup data value.

At each setup mode terminal to target distance, there can also be recorded as setup data formation distances at various terminal to target distances d; i.e., the actual distance between the formations on a test substrate, e.g., substrate 206. Once formation distances, $d_1$ and $d_2$ are recorded as setup data at a set of controlled terminal to target distances, $z_1$ and $z_2$, where pixel distances $p_1$ and $p_2$ are also recorded at the setup mode terminal to target distances $z_1$, $z_2$, the distance $d_n$, the present distance between formations 20, 22, at any terminal to target distance can be determined by application of the formula:

$$d_n = g/(z_n - f) \qquad \text{(eq. 3)}$$

where $z_n$ is the present terminal to target distance which can be determined utilizing the measured present pixel distance, $p_n$, by applying Equation 2, where f and g are constants solved applying linear interpolation utilizing the set of linear interpolation formulas $z_1 = f + g/d_1$; $z_2 = f + g/d_2$; where $z_1$ is a first setup mode terminal to target distance recorded as a setup data value, $z_2$ is the second terminal to target distance recorded as a setup data value, and $d_1$ and $d_2$ are the actual recorded setup data value distances (the distance between formations 20, 22) while the terminal is positioned at the first distance, $z_1$, and the second distance, $z_2$, respectively. The actual setup data distances $d_1$, $d_2$ can be recorded manually, e.g., by measuring with a ruler; or automatically, e.g., by disposing on target substrate 206 a grid having reference distance indicators and processing a frame of image data including a representation of the formations 20, 22, formations 20a, 22a and the grid. It is seen that both the present terminal to target distance, $z_n$, and formation distance $d_n$ (the actual distance between formations 20, 22) can be determined utilizing a present pixel distance $p_n$ of formation representations and recorded setup data values (e.g., $z_1$, $z_2$, $p_1$, $p_2$, $d_1$, $d_2$) and/or data (e.g., formula constants) determined utilizing such setup data recorded in a setup mode.

By recording setup data in the manner described herein, terminal 10 can determine accurate spatial measurements, e.g., terminal target distance measurements, and dimension (h, w, l) measurements even where, as a result of manufacturing tolerances, at least one light formation is projected by the terminal angle that deviates from a desired angle of projection. For example, where a light formation projecting light beam is designed to project a beam in parallel with an imaging axis 30, the light beam, due to manufacturing tolerances might be projected substantially in parallel with the imaging axis but might deviate from a parallel relationship with the imaging axis by a deviation angle with less than 3 degrees. Similarly where terminal 10 is designed to project a first and second light formation, the terminal might be designed to project beams forming the formations parallel to one another, but due to manufacturing tolerances, the beams might, though substantially parallel, diverge at a deviation angle of less than 5%. It will be seen that utilizing setup data as described herein, terminal 10 when operating in a spatial measurement mode can normalize changes in pixel distances measurements resulting from such deviation angles so that determined spatial measurements are substantially independent of the terminal to target distance. Utilizing setup data as described herein, it will be understood that indicia reading terminal 10 can normalize terminal to target distance dependent changes in pixel distance measurements resulting from a deviation angle as described herein so that spatial measurements are substantially independent of the terminal to target distance.

With setup data recorded in a setup mode, terminal 10 can be configured so that in an "in use" spatial measurement mode, the terminal can utilize the setup data recorded in a setup mode and/or data (e.g., formula constants) determined utilizing the setup data to perform spatial measurement calculations. In utilizing the setup data recorded in a setup mode and/or data determined utilizing the setup data, terminal 10 can apply various formulas e.g., Equation 2 or Equation 3 described herein having constants determined utilizing the setup data. As described herein the setup data recorded in a setup mode can include recorded pixel position data and, therefore, pixel distance data derivable from pixel position data at one or more controlled terminal to target distances. Recorded setup data recorded in a setup mode can also include actual formation distances (the actual recorded distance between formations) at various controlled terminal to target distances. Data determined utilizing recorded setup data recorded in a setup mode can include constants of formulas derived from the recorded setup data z distance, pixel distance, and/or actual formation distance data recorded in a setup mode.

Referring again to terminal 10 as shown in FIG. 1, terminal 10 can include a preassembled imaging module configured to project formations. An example of an imaging module that can be utilized with terminal 10 is shown and described with reference to FIGS. 3 and 4.

Figure 3:
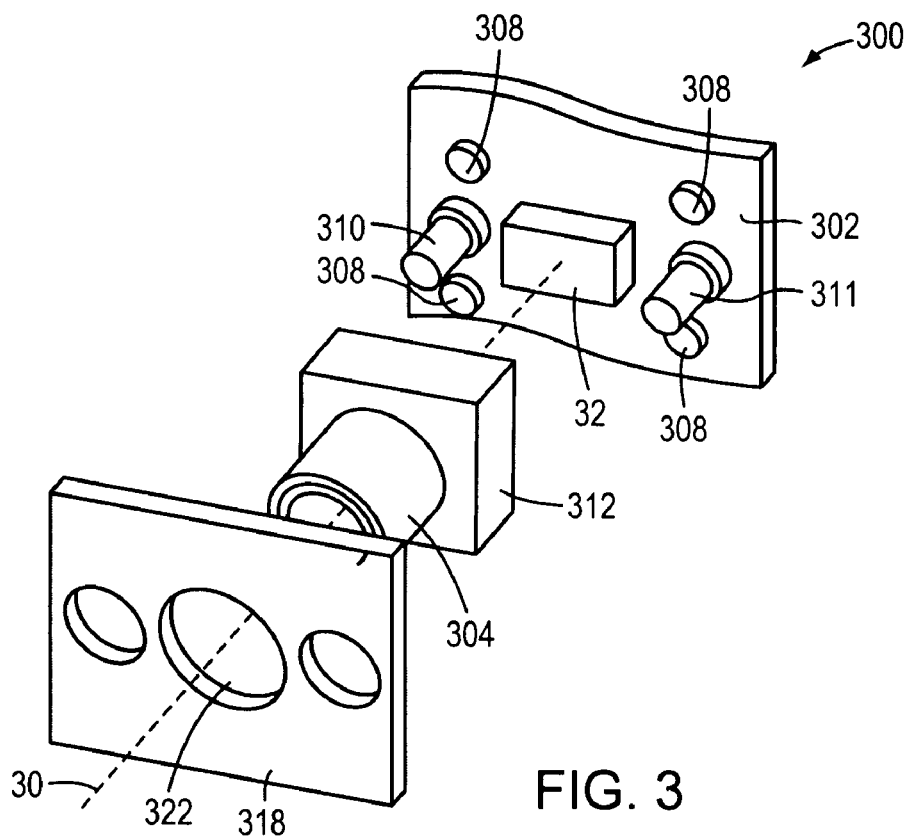
FIG. 3 is a perspective exploded view of an imaging module which can be incorporated in a hand held housing of an indicia reading terminal.
Figure 4:
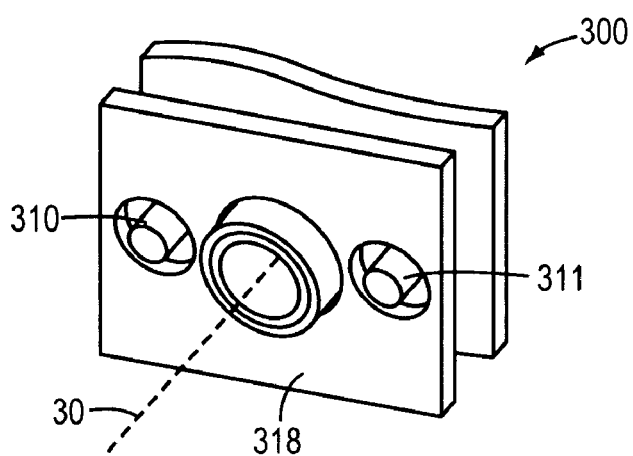
FIG. 4. is a perspective assembly view of an imaging module as shown in FIG. 3.

Referring to FIGS. 3 and 4, imaging module 300 for supporting various components of terminal 10 is described. Mounted on first circuit board 302 can be image sensor 32, illumination light sources 308 (e.g., LEDs), and aiming light sources 310, 311 which can be provided by laser diode assemblies. A shroud 312 can be disposed forwardly of image sensor 32, and disposed forwardly of shroud 312 can be a lens holder 304, for holding an imaging lens. An optical plate 318 having a diffusion surface formed thereon for diffusing light from illumination light sources 308 can be disposed over holder 304 so that hole 322 fits over holder 304. An imaging module in an assembled form is shown in FIG. 4. Imaging module 300 can be incorporated in and can be supported by hand held housing 11 of terminal 10.

Figure 5:
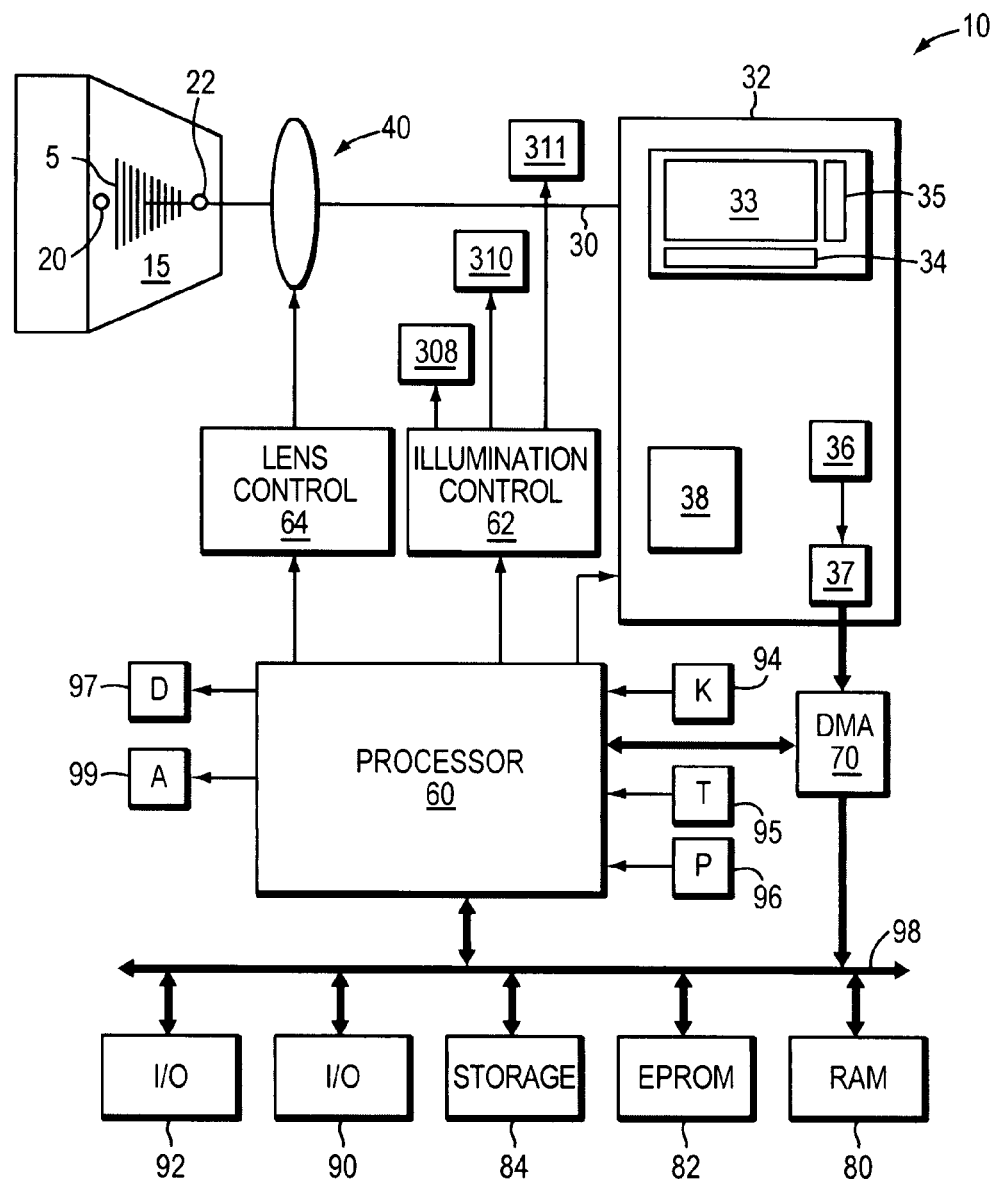
FIG. 5 is a block diagram illustrating various hardware components of an indicia reading terminal in one embodiment.

A block diagram of an electrical component circuit diagram supporting operations of terminal 10 is shown in FIG. 5. Terminal 10 can include image sensor 32 which can be provided on an integrated circuit having an image sensor pixel array 33 (image sensor array), column circuitry 34, row circuitry 35, a gain block 36, an analog-to-digital converter 37, and a timing and control circuit 38. Image sensor array 33 can be a two dimensional image sensor array having a plurality of light sensitive pixels formed in a plurality of rows and columns. Terminal 10 can further include a processor 60, an illumination control circuit 62, a lens control circuit 64, an imaging lens assembly 40, a direct memory access (DMA) unit 70, a volatile system memory 80 (e.g., a RAM), a nonvolatile system memory 82 (e.g., EPROM), a storage memory 84, a wireline input/output interface 90 (e.g., Ethernet), and an RF transceiver interface 92 (e.g., IEEE 802.11). As shown throughout various views, terminal 10 can include imaging axis 30. In one example, the recorded data including the derived formula constants described herein for determining a z distance and/or an actual formation distance (distance between formations) described with reference to a setup mode can be retained in nonvolatile memory 82, where the data can be accessed by processor 60 when executing steps of a program wherein a dimensioning value can be determined. In the embodiment of FIG. 5, terminal 10 can include a single image sensor array 33 disposed on a single image sensor 32, and terminal 10 can determine terminal to target distances (z distance) and horizontal/vertical dimensions (w, l dimensions) by processing image data corresponding to image signals generated by single image sensor array 33.

Regarding illumination control circuit 62, illumination control circuit 62 can receive illumination control signals from processor 60 and can responsively deliver power to one or more illumination light sources such as light sources 308, and one or more aiming light sources such as aiming light sources 310 and 311 shown as being provided by laser diode assemblies. Terminal 10 can also include a keyboard 94, a trigger button 95, and a pointer controller 96 for input of data and for initiation of various controls and a display 97 for output of information to an operator user. Terminal 10 can also have an acoustic output device 99. Terminal 10 can also include a system bus 98 providing communication between processor 60 and various components of terminal 10. DMA unit 70 can be provided by, e.g., a field programmable gate array (FPGA) or an application specific integrated circuit (ASIC). While shown as being separate units, DMA unit 70 and processor 60 can be provided on a common integrated circuit. In response to control signals received from processor 60, timing and control circuit 38 can send image sensor array 33 timing signals to array 33 such as reset, exposure control, and readout timing signals. After an exposure period, a frame of image data can be read out. Analog image signals that are read out of array 33 can be amplified by gain block 36 converted into digital form by analog-to-digital converter 37 and sent to DMA unit 70. DMA unit 70, in turn, can transfer digitized image data into volatile memory 80. Processor 60 can address one or more frames of image data retained in volatile memory 80 for processing of the frames for determining a dimension of an article and/or for decoding of decodable indicia represented therein.

Further aspects of terminal 10 are now described with reference to FIG. 1 and the flow diagram of FIG. 6.

It is seen with reference to the view of FIG. 1 that terminal 10 can incorporate a graphical user interface and can present buttons 106, 108, 110 corresponding to various operating modes such as a setup mode, a spatial measurement mode, and an indicia decode mode. While the setup mode described herein can be performed as part of a manufacturing process prior to terminal 10 being delivered to an end user, the mode can also be made available as a selectable menu option that may be selected by a user who has access to a controlled test environment wherein terminal 10 to target distances can be controlled. It may be desirable to run the setup mode a second time after a first time on manufacture, e.g., if aiming light sources of terminal 10 have become misaligned through use. Further respecting the menu buttons, terminal 10 can be configured so that selection of button 106 activates a setup mode, selection of button 108 activates a spatial measurement operating mode, and selection of decode button 110 activates a decode button. An exemplary setup mode has been described herein above with reference to FIG. 2. While configuring terminal 10 to include a menu interface for use in selecting the mentioned modes of operation, it is understood that terminal 10 can be configured so that the various modes may be made active without use of a menu interface. Also, terminal 10 can be configured so that more than one of the described modes can be active simultaneously. For example, terminal 10 can be configured to perform spatial measurements simultaneously while decoding decodable indicia, and to output spatial measurement information simultaneously while outputting decoded message data.

Regarding a spatial measurement mode, an exemplary spatial measurement mode which may be made active by selection of button 106 is described with reference to the flow diagram of FIG. 6. In a spatial measurement operating mode, terminal 10 can perform one or more spatial measurements, e.g., measurements to determine one or more of a terminal to target distance (z distance) or a dimension (e.g., w, l, h) of an article or another spatial related measurement (e.g., a volume measurement, a distance measurement between any two points). Returning to the illustrative example of FIG. 6, at block 602, terminal 10 can capture a frame of image data. Terminal 10 can be configured so that block 602 is executed responsively to trigger 95 being initiated. At block 606, terminal 10 can find representations of formations 20, 22 in the captured frame of image data captured at block 602. Representations of formations 20, 22 will typically include a cluster (a set of positionally adjacent pixel values) of high white level pixel values and accordingly, can be easily discriminated from other pixel values. At block 606, terminal 10 can determine the pixel positions associated with each light pattern formation 20, 22; and therefrom, can determine a pixel distance value, $p_n$, for the set of formations. A center of a representation of a formation 20, 22 can be regarded as a pixel position for the formation representation. At block 610, terminal 10 can determine an actual distance, $d_n$, between formations 20, 22 that have been projected on a substrate, e.g., article 15 within a field of view 25 of terminal 10. In executing block 610, terminal 10 can utilize recorded data recorded in a setup mode of operation. For example, in a setup mode there can be recorded the constants (coefficients) of Equations 2 or 3, and terminal 10 at block 610 can apply Equation 2 at block 610 for determination of a present terminal to target distance (z distance) and can apply Equation 3 at block 610 for determination of a present distance, $d_n$, between formations 20, 22. Alternatively at block 610, terminal 10 can determine the present formation distance $d_n$, by reading a predetermined value based on the design specifications of terminal 10.

Figure 6:
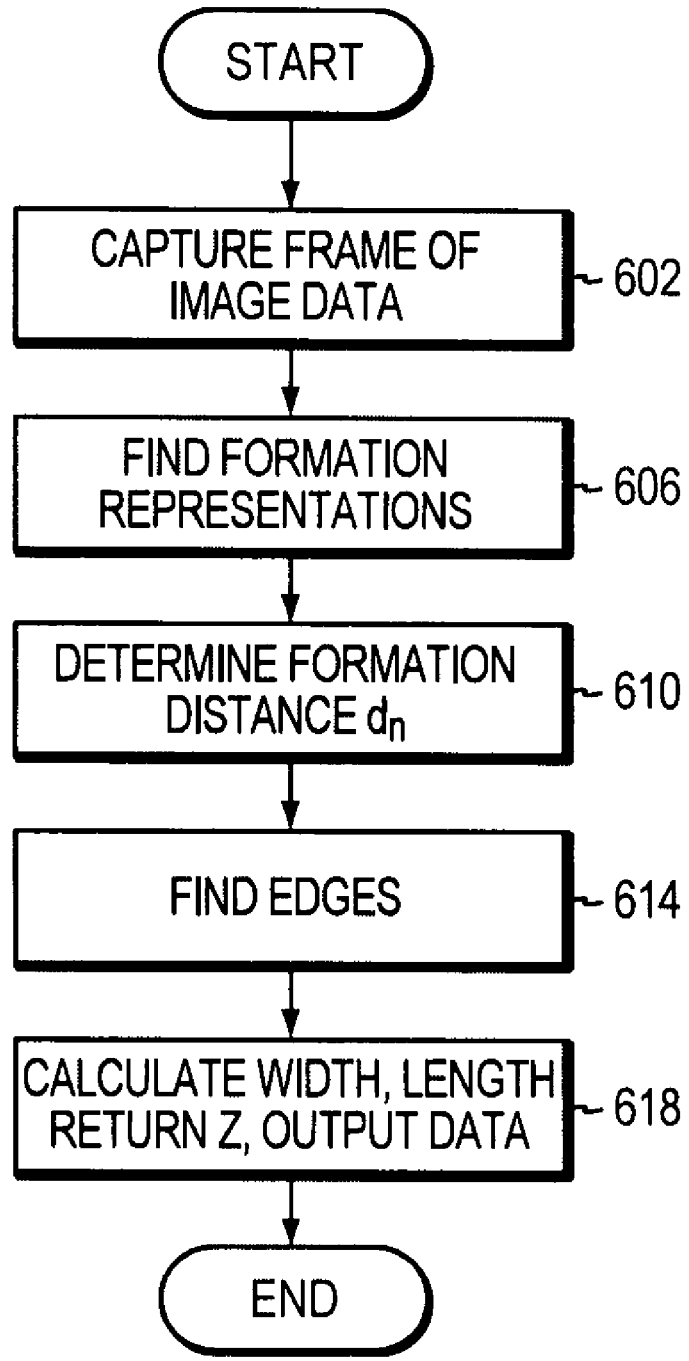
FIG. 6 is a flow diagram illustrating operation of an indicia reading terminal in a measurement mode of operation in one embodiment.

Further referring to the flow diagram of FIG. 6 terminal 10 at block 614 can determine pixel positions of the frame of image data captured at block 602 corresponding to edges 130, 132 of article 15 being subject to dimension measuring (dimensioning). For finding representations of edges, terminal 10 can apply a suitable edge detection mask (e.g., a 3×3 kernel mask) to the captured frame of image data. Suitable edge detection masks can include, e.g., Laplacian or Laplacian of Gaussian (LoG) masks. When the pixel positions representing a pair of opposing edges 130, 132 has been determined, a pixel distance between pixel positions of the edge representations can be determined. For determining a distance between edge representations, a line can be drawn in the frame of image data between the representations of formations 20, 22 and the points of the edge positions intersecting the line can be selected as the edge representation points of interest for determining the edge pixel distance, $P_n$. At block 602 terminal 10 can also determine a pixel distance, $P_n'$, between representations of vertical edges 134, 136 of article 15 using any of the methods described herein for determining the pixel distance of representations of edges 130, 132.

When the edge pixel distance, $P_n$, is determined at block 614, terminal 10 further at block 614 can apply the edge pixel distance and the formation pixel distance, $p_n$, together with the determined actual formation distance, $d_n$, in the formula of Equation 1 to return a package dimension (e.g., the X direction width dimension (w) of article 15). Terminal 10 at block 614 can also determine a present z distance (terminal to target object distance) utilizing recorded data recorded during a setup mode, e.g., by application of the formula of Equation 2, constants of which can be stored in a memory, e.g., memory accessible by processor during the setup mode or determined at block 614. At block 614, terminal 10 can also determine a length of a dimension, l, of article 15 applying Equation 1, substituting $P_n'$ for $P_n$ therein, where $P_n'$ is the pixel distance between article representation edges in the Y direction (see the X, Y, z reference axes in FIG. 1). At block 618, terminal 10 can output the determined package dimension value, e.g., width, w, length, l, height, h, present z distance value (i.e., the distance between terminal 10 and the object 15 being subject to measurement), and present actual formation distance, $d_n$, value. When outputting such data, terminal 10 can display the data on display 97.

In one embodiment of a spatial measurement mode, terminal 10 can be configured so that when a spatial measurement mode is made active, terminal 10 waits for trigger 95 to be actuated (depressed and released) a first and second time, processes a frame of image data captured responsively to each trigger actuation and automatically outputs a volume dimension of article 15 after processing a frame captured responsively to the second trigger actuation. More specifically in the described embodiment, terminal 10 after trigger 95 is depressed a first time can capture and process a first frame of image data to determine width and length (w and l) dimensions of an article 15 as has been described herein. With w and l dimensions determined responsively to a first trigger depress and release, an operator can move terminal 10 and/or article 15 in such manner that when a trigger 95 is pulled a second time, terminal 10 will have a field of view 25 in which an adjacent side of article 15 is encompassed within a field of view 25 of terminal 10 in such a manner that formations are projected at the location of formations 20', 22' as is shown in FIG. 1. Accordingly, when trigger 95 is depressed a second time after a spatial measurement mode is made active terminal 10 can capture and processes a frame of image data to determine a height dimension, h, utilizing Equation 1 with new edge pixel distance values substituted for $p_n$ in Equation 1, and utilizes the determined width (w), length (l), and height (h) dimensions to return a volume measurement for terminal 10. According to the described embodiment, terminal 10, after a spatial measurement mode is made active, waits for trigger 95 to be actuated first and second times. After actuation (e.g., depression and release) of trigger 95 a first time, terminal 10 can capture and process a frame of image data to calculate one or two of w, l, h dimensions of an article in the field of view. After an actuation of trigger 95 a second time, terminal 10 can capture and process a second frame of image data to calculate at least two of w, l, h dimensions of article x and multiply the dimension(s) calculated with the dimension(s) calculated utilizing the first frame of information to return a volume value which can be output (e.g., to a display 97).

Figures 9, 10:
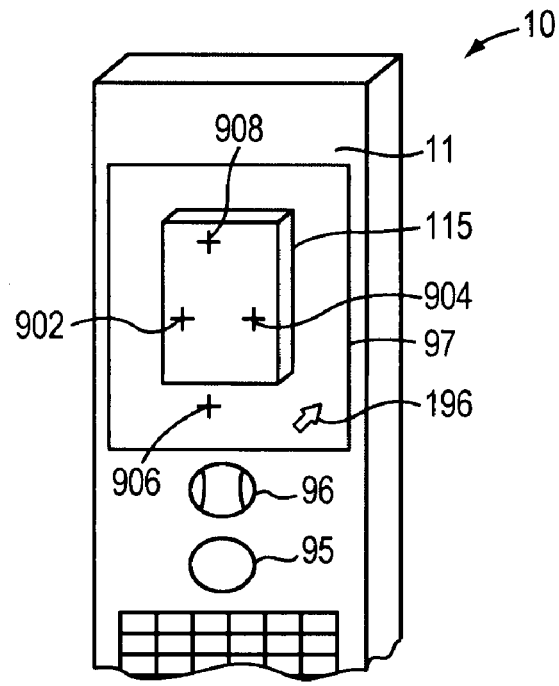
FIG. 9 is a diagram illustrating an exemplary database in the form of a lookup table which may be utilized by an indicia reading terminal.
FIG. 10 is a view of an indicia reading terminal having a user interface configured to enable an operator to designate edge information of a frame of image data subject to image processing.

In another embodiment, terminal 10, for example at block 618 when executing the steps of the flow diagram of FIG. 6 can automatically return a missing dimension value e.g., a height value, h, by processing a frame of image data to determine one or more article dimensions, e.g., a width or length or height of article 15 utilizing previously known characteristics of the types of articles that are expected to be subjected to image capture by terminals. For example, terminal 10 can be configured so that at block 618 terminal 10 queries a database, e.g., a lookup table such as lookup table 900 of FIG. 9 correlating box dimensions (w, l, h) of various candidate box types. In certain data collection applications it is expected that certain articles might be made available in a limited number of predetermined sizes. In such applications a lookup table in communication with terminal 10 which can be co-located at terminal 10 can be provided with rows corresponding to each candidate box size correlating box dimensions and a volume value. If no two candidate box sizes share a common dimension, it will be seen that with use of a lookup table as described, a volume measurement for an article in the form of a box can be returned utilizing the lookup table by determining a single dimension, (w, l, h) of such a box. In the lookup table 900 as shown in FIG. 9, there is shown a lookup table configured for use in an application wherein there are five candidate boxes with none of the boxes having a dimension (w, l, h) in common with another candidate box. In such an application, terminal 10 utilizing lookup table 900 can determine any box dimension and a volume value for a box by determining by way of image processing a single dimension (w, l, or h) for a box and utilizing lookup table 900 to determine the remaining dimensions and volume value for the box. Where no two candidate boxes of a set of candidate boxes share more than one common width (w), length (l), or height (h) dimension, box sizes (types) can be discriminated and missing box dimension and volume values determined utilizing only two determined dimension values (e.g., w and l) determined by way of image processing. A volume value of an article 15, as well as a type identifier of article 15 can be output to display 97 at block 618.

It has been described relative to the flow diagram of FIG. 6 that terminal 10 at block 614 can find edges 130, 132 by utilizing an appropriate edge finding image processing algorithm. In another embodiment, terminal 10 at block 614 can find edges of an article utilizing feature information designated by an operator. For example, by reading edge positions of a captured image that are designated by an operator. In one embodiment, terminal 10 can be configured so when a trigger 95 is depressed to capture a frame with a spatial measurement mode made active, terminal 10 outputs the frame to display 97 for spatial viewing by an operator together with operator controllable indicators superimposed on the displayed image. Terminal 10 can be configured so that an operator can control the positioning of the superimposed indicators e.g., cursors with use of pointer controller 96 to designate edge positions of a captured frame captured for processing for determining of dimensioning and/or other measurement information. As shown in FIG. 10 terminal 10 can be configured so that in a spatial measurement mode terminal 10 displays on display 97 captured frames captured for processing for determination of measurement information. Terminal 10 can be configured so that together with representation 115 of article 15 there can be display indicators on display 97 for use in designating edge positions. In the example of FIG. 10 the formations are in the form of cursors 902, 904, 906, 908, including a first set of cursors 902 and 904, and a second set of cursors 906 and 908. Terminal 10 can be configured so that an operator with use of pointer controller 96 and pointer 196 can move first set of cursors 902, 904 for designating edges of an article in the width dimension of the article 15 and can utilize cursors 906, 908 to designate edges of article 15 in a length dimension of article 15. Terminal 10 can also be configured so that an operator can apply the cursors 902, 904, 906, 908 on the representations of the four corners of an article, represented in the form of a box, and terminal 10 can draw lines through such designated points to define w and l dimension edges of the representations of article 15 being processed. An embodiment where terminal 10 is configured so that an operator can designate edge positions on an article representation either by designating edges representations directly or article corner representations relative to an article representation, terminal 10 at block 614 in finding edge positions of an article representation can read the designated positions designated by an operator.

In another aspect, terminal 10 can be configured so that terminal 10 can adjust a position of designed corner representation designated manually by an operator responsively to image processing of the frame of image data including the article representation. For example, terminal 10 can be configured so that responsively to a corner representation being designated, terminal 10 establishes a subset of the image data making up of the frame of image data as a region of interest and then subjects the image data of the region of interest to image processing, e.g., application of edge detection masks for location edge representations within the region of interest. Terminal 10 can be configured to adjust the position of the corner position if the processing of the image data indicates that the actual position of the corner representation is different than the position of the corner representation designated by the operation. The region of interest can be positionally related to the designated corner representation designated by the operator. In one embodiment, the region of interest can be a predetermined two dimensional set of pixel positions surrounding the center pixel position of a corner representation designated by an operator. In an embodiment where terminal 10 automatically adjusts a designated corner position by subjecting a region of interest about the designated corner point to edge finding image processing, it is seen that terminal 10 utilizes both user (operator) designated feature information designated by an operator and edge detection image processing in finding edges of an article representation.

In another embodiment where terminal 10 utilizes both user designated feature information and edge finding image processing in finding edges of an article representation at block 614, terminal 10 finds edge representations of an article representation responsively to an operator designating a limited number of corner representations of the article representation. For example, terminal 10 can prompt an operator to designate a single corner representation of a frame of image data which position may or may not be single corner representation of a frame of image data which position may or may not be then adjusted responsively to image processing as described above. Terminal 10 can then determine the edge positions of the article representation by application of an edge detection image processing algorithm and can utilize the user designated corner position in verifying that the detected edges are actual article edge representations and not "false" edge position representation as might be created, e.g., by a representation of an article including a representation of a photograph of a box.

In another example, terminal 10 can automatically determine the locations of representations of article edges in a captured frame of image data by drawing lines through a limited number of corner positions designated by an operator (which may be adjusted or not adjusted as described) and interpolating missing lines as is necessary. In one example, terminal 10 responsively to an operator designating successive first, second, and third corner representations have been designated, can draw a first imaginary line intersecting the first and second designated corner representations and a second imaginary line intersecting the second and third designated corner representation. Terminal 10 can then draw an imaginary third line parallel to the first line and intersecting the third designated corner, and an imaginary fourth line parallel to the second line and intersecting the first designated corner. Edge pixel distances can be determined utilizing the first and third lines and/or the second and fourth lines.

Regarding a decode mode of operation, terminal 10 can be configured so that with a decode mode active, depressing trigger 95 drives terminal 10 into an active reading state. In an active reading state, terminal 10 can attempt to decode decodable indicia such as bar code symbols or OCR characters represented in captured frames of image data. In an active reading state, terminal 10 can be adapted so that processor 60 can subject to a decode attempt a frame of image data retained in memory 80. For example, in attempting to decode a ID bar code symbol represented in a frame of image data, processor 60 can execute the following processes. First, processor 60 can launch a scan line in a frame of image data, e.g., at a center of a frame, or a coordinate location determined to include a decodable indicia representation. Next, processor 60 can perform a second derivative edge detection to detect edges. After completing edge detection, processor 60 can determine data indicating widths between edges. Processor 60 can then search for start/stop character element sequences, and if found, derive element sequence characters character by character by comparing with a character set table. For certain symbologies, processor 60 can also perform a checksum computation. If processor 60 successfully determines all characters between a start/stop character sequence and successfully calculates a checksum (if applicable), processor 60 can output a decoded message. When outputting a decoded message, processor 60 can one or more of (a) initiate transfer of the decoded message to an external device, (b) initiate display of a decoded message on a display of terminal 10, (c) attach a flag to a buffered decoded message determined by processor 60, and (d) write the decoded message to an address of long term memory, e.g., 82 and/or 84. At the time of outputting a decoded message, processor 60 can send a signal to an acoustic output device 99 of terminal 10 to emit a beep. When outputting measurement data at block 618, which can include package volume measurement data, terminal 10 can one or more (a) initiate transfer of the measurement information to an external device, (b) initiate display of the measurement information to a display of terminal 10, (c) attach a flag to buffered measurement information and (d) write the measurement information to an address of a long term memory, e.g., 82 or 84.

Figures 7, 8:
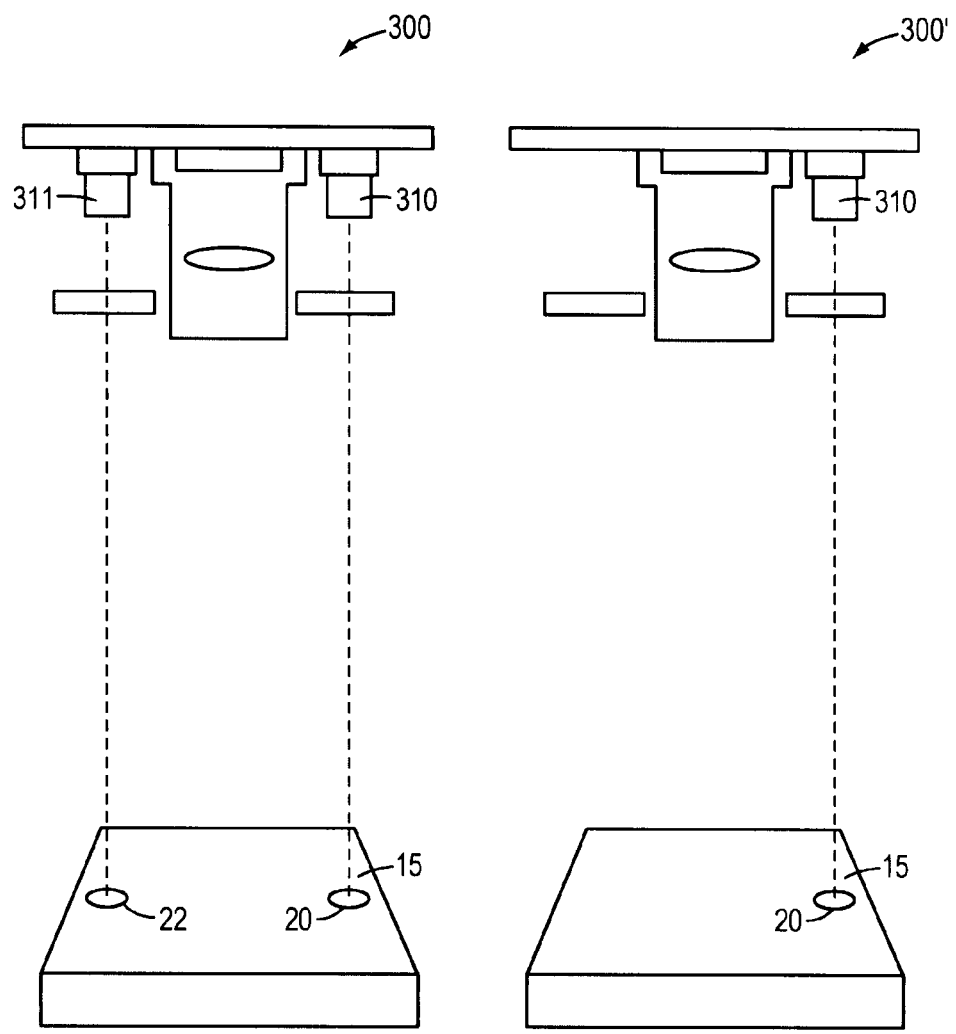
FIG. 7 is a top view of an imaging module projecting a pair of dimensioning light formations for use in determining dimensioning information shown in combination with an article being subject to dimensioning.
FIG. 8 is a top view of an imaging module projecting a single dimensioning light formation for use in determining dimensioning information shown in combination with an article being subject to dimensioning.

In the embodiment of FIGS. 1-6, terminal 10 is configured to project a pair of formations 20, 22 on substrate 15 for use in determining a dimension of a substrate, provided in the example by article 15. Such formations can be produced with use of a light generating assembly having a pair of laser diode assemblies 310, 311 as shown in FIGS. 3 and 4 and further as is shown in the top view of FIG. 7. Alternatively, a light generating assembly can be employed that includes, e.g., a single laser diode assembly in combination with light shaping elements adapted so that a pair of light formations 20, 22 are projected on a substrate. In any of the described embodiments, each laser diode assembly can be replaced by a light emitting diode (LED) in combination with light shaping optics suitable for projecting of a light formation. In another embodiment, terminal 10 can be adapted to project a single light formation 20 on substrate 206 provided by article 15 for purposes of determining one or more dimensions of terminal 10. In FIG. 8, there is shown a top view of an alternative imaging module 300' having a single laser diode assembly 310 for projecting a single light formation 20 on substrate 15. Module 300' is identical to module 300 except that second laser diode assembly 311 is deleted.

Where terminal 10 includes an imaging module 300' that projects a single light formation 20 rather than a plurality of light formations, the recording of data in a setup mode is the same as in the example described above except that a center or other fixed reference pixel position value is substituted for the second formation pixel position data recording. It is observed that the pixel position of a representation of single formation 20 relative to an arbitrary reference pixel position will vary as the z distance of terminal 10 is changed. For performance of determining dimensioning information, steps including determination of an actual distance between a pair of projected formations 20, 22 can be substituted by steps for determining the actual distance between a position of a single formation 20 and a reference position e.g., center of a field of view of terminal 10. In one embodiment of a terminal including a single formation projecting light generating assembly where the assembly projects a light beam forming the formation substantially parallel to an imaging axis 30, the single light formation is projected at a position spaced apart from the position at which an imaging axis 30 of terminal 10 intersects a substrate onto which the formation is projected. In such manner, the pixel position of a representation of the formation will vary in a captured frame of image data in a manner that depends on the spacing between terminal 10 and the substrate.

While an embodiment wherein a single dimensioning formation 20 is projected onto substrate 15 may be preferred for cost reasons in some embodiments, an embodiment wherein a plurality of dimensioning formations are projected may provide ease of use and accuracy advantages. In each embodiment described, projected dimensioning formations 20, 22 can be projected using visible light rays. Accordingly, the projecting of a pair of formations on a substrate, e.g., substrate 15 allows terminal 10 to be easily oriented in an orientation relative to article 15 that will yield a desired distance measurement. For purposes of improving the accuracy with which a dimension or an article can be measured, terminal 10, where equipped with a light generating assembly projecting a pair of light formations, should be aligned with an article in such manner that the pair of formations are projected in a substantially parallel orientation relative to a first (e.g., edge 134) edge of the article being subject to dimensioning and substantially perpendicularly relative to a second edge (e.g., edge 132) of the article being subjected to dimensioning where the article being subject to dimensioning is a typical box comprising a plurality of substantially straight, right angle related edges. In a method for utilizing terminal 10 having a dimensioning formation projecting light generating assembly, a spatial measurement mode can be selected (activated), terminal 10 can be manually aligned so that formations 20, 22 are projected as shown in FIG. 1 substantially parallel to a first edge of an article and substantially perpendicular to a second edge of an article, an actuator e.g., trigger 95 can be actuated to capture a frame of image data representing the article, and the frame of image data can be processed to determine a dimension e.g., w, l, h of the article, in a manner described herein. For example, terminal 10 by processing the frame of image data can determine $P_n$, the distance between representations of a pair of opposing edges (e.g., 130, 132), $p_n$, the pixel distance between representations of formations 20, 22, and can determine a dimension utilizing $P_n$, $p_n$, and $d_n$, where $d_n$ is an estimated present actual distance between formations 20, 22 which can be either a predetermined value selected based on design specifications of terminal 10 or a determined value determined utilizing one or more of setup data and data determined utilizing setup data. The selecting and aligning steps can be any order. In other aspects of the described method, an instruction manual can be provided. The instruction manual can be e.g., a paper instruction manual and an electronically displayed instruction manual for display e.g., on display 97 or a played audio recording instruction manual. The instruction manual can include the instruction that an operator should align terminal 10 so that formations 20, 22 are oriented so as to be oriented at least one of parallel with a first edge of an article or perpendicular to a second edge of article 15 prior to a time that trigger 95 is actuated to capture a frame of image data to be subject to processing for measurement determination.

A small sample of systems methods and apparatus that are described herein is as follows:

A1. An indicia reading terminal comprising:

an image sensor having a plurality of pixels formed in a plurality of rows and columns of pixels, wherein said indicia reading terminal has a field of view;

an imaging lens focusing an image of an article within said field of view onto said image sensor;

a light generating assembly projecting at least a first light formation onto said article for determining dimension information of said article, said first light formation being projected onto said article within said field of view of said indicia reading terminal;

wherein said indicia reading terminal is operable in a spatial measurement mode of operation in which said indicia reading terminal determines at least one of a width, length or height dimension of said article;

wherein said indicia reading terminal, when operating in said spatial measurement mode of operation processes a frame of image data including a representation of said article and determines a pixel position for a representation of said at least one formation; and wherein said indicia reading terminal, further in said spatial measurement mode of operation utilizes at least one of setup data determined prior to said spatial measurement mode of operation being made active, and data determined utilizing said setup data.

A2. The indicia reading terminal of claim A1, wherein said indicia reading terminal is configured to project first and second light formations onto said target substrate.

A3. The indicia reading terminal of claim A1, wherein said terminal is configured to project first and second formations onto said article, and wherein said setup data includes pixel position data for representations of said first and second light formations, at each of a first and second terminal to target distances.

A4. The indicia reading terminal of claim A1, wherein said terminal is configured to project first and second formations onto said article, and wherein said setup data includes pixel position data for representations of said first and second light formations, at each of a first and second terminal to target distances, and wherein said setup data further includes actual formation distances (the distance between the formations) at each of said first and second terminal to target distances.

A5. The indicia reading terminal of claim A1, further including a display, wherein said indicia reading terminal is configured so that in said spatial measurement mode of operation said indicia reading terminal displays on said display a frame of image data being subjected to processing for determining measurement information, and further presents on said display indicators which may be moved by an operator to designate feature information of said frame of image data.

A6. The indicia reading terminal of claim A1, wherein said indicia reading terminal is in communication with an article database, the article database including dimension information for various candidate article types, and wherein said indicia reading terminal is configured so that in said spatial measurement mode said indicia reading terminal determines one or two of width, length, or height dimensions of said article by way of image processing, and utilizes said article database in for determining one or more of (a) an article type identifier; (b) an article volume value; and (c) missing dimension(s) of said article not determined by way of image processing.

B1. An indicia reading terminal comprising:

an image sensor having a plurality of pixels formed in a plurality of rows and columns of pixels, wherein said indicia reading terminal has a field of view;

an imaging lens focusing an image of a target substrate within said field of view onto said image sensor;

a light generating assembly projecting at least a first light formation onto said article for determining a distance of said indicia reading terminal to said target substrate, said first light formation being projected onto said target substrate within said field of view of said indicia reading terminal;

wherein said indicia reading terminal is operable in a spatial measurement mode of operation in which said indicia reading terminal determines a distance of said indicia reading terminal to said target substrate;

wherein said indicia reading terminal, when operating in said spatial measurement mode of operation processes a frame of image data including a representation of said article and determines a pixel position for a representation of said at least one formation; and wherein said indicia reading terminal, further while operating in said spatial measurement mode of operation to determine said distance of said indicia reading terminal to said target substrate utilizes at least one of setup data determined prior to said spatial measurement mode of operation being made active, and data determined utilizing said setup data.

B2. The indicia reading terminal of claim B1, wherein said indicia reading terminal is configured to project first and second light formations onto said target substrate.

B3. The indicia reading terminal of claim B1, further including a display, wherein said indicia reading terminal is configured so that in said spatial measurement mode of operation said indicia reading terminal displays on said display a frame of image data being subjected to processing for determining measurement information, and further presents on said display indicators which may be moved by an operator to designate edge positions of said frame of image data.

B4. The indicia reading terminal of claim B1, wherein said indicia reading terminal is in communication with an article database, the article database including dimension information for various candidate article types, and wherein said indicia reading terminal is configured so that in said spatial measurement mode said indicia reading terminal determines one or two of width, length, or height dimensions of said article by way of image processing, and utilizes said article database in for determining one or more of (a) an article type identifier; (b) an article volume value; and (c) missing dimension(s) of said article not determined by way of image processing.

C1. A method for operating an indicia reading terminal comprising the steps of:
configuring said indicia reading terminal to project at least a first light formation on a substrate within a present field of view of said terminal;
operating the indicia reading terminal in a setup mode of operation;
while said indicia reading terminal is in said setup mode of operation, moving said indicia reading terminal between certain terminal to target distances and for each certain distance, recording setup data;
thereafter operating said indicia reading terminal in a spatial measurement mode of operation, wherein said indicia reading terminal in said spatial measurement mode is configured to determine a dimension of an article in a field of view of said indicia reading terminal utilizing at least one of said setup data determined in said setup mode of operation, or data determined utilizing said setup data.

C2. The method of claim C1, wherein said configuring step includes the step of configuring said indicia reading terminal to include a light generating system projecting first and second light formations on said substrate.

C3. The method of claim C1, wherein said setup data includes setup data selected from the group consisting of pixel position data of representations of each of said first and second formation at each of a first and second terminal to target distance, pixel distance of representations of said formations at each of said first and second terminal to target distance, and prerecorded actual distance between said first light formation and said second light formation.

D1. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting at least a first light formations onto said article for determining dimension information of said article, said first light formation being projected onto said article within said field of view of said indicia reading terminal;
wherein said indicia reading terminal is operable in a spatial measurement mode of operation in which said indicia reading terminal determines at least one of a width, length or height dimension of said article;
wherein said indicia reading terminal, when operating in said spatial measurement mode processes a frame of image data including a representation of said article, determines a pixel position for a representation of said at least one light formation and finds representations of edges of said article; and
wherein said indicia reading terminal, further in said spatial measurement mode of operation determines $p_n$, the pixel distance between said pixel position and one of (a) a pixel position corresponding to another light formation or (b) a reference pixel position, determines $P_n$, the pixel distance between said representations of edges of said article, and determines a dimension of said article selected from the group consisting of width, length, and height dimensions of said article utilizing said determined $p_n$, and $P_n$ values and $d_n$ where $d_n$ is an estimated present actual distance between said at least one light formation and (a) another light formation projected by said indicia reading terminal, and (b) a reference position.

D2. The indicia reading terminal of claim D1, further including a display, wherein said indicia reading terminal is configured so that in said measurement operating mode said indicia reading terminal displays on said display a frame of image data being subjected to processing for dimensioning, and further presents on said display indicators which may be moved by an operator to designate edge positions of said frame of image data, wherein said indicia reading terminal in finding said representations of said edges reads said edge positions designated by said operator.

D3. The indicia reading terminal of claim D1, wherein $d_n$ is a predetermined value based on design specifications for said indicia reading terminal.

D4. The indicia reading terminal of claim D1, wherein $d_n$ is a calculated value calculated utilizing at least one of setup data recorded in a setup mode of operation and data determined utilizing said setup data.

D5. The indicia reading terminal of claim D1, wherein said indicia reading terminal, when operating in said spatial measurement mode of operation applies the formula $D=(P_n*d_n)/p_n$ where D is the dimension being determined.

D6. The indicia reading terminal of claim D1, wherein said indicia reading terminal, for finding said representations of edges, reads edge positions that have been designated by an operator of said indicia reading terminal.

D7. The indicia reading terminal of claim D1, wherein said indicia reading terminal, for finding said representation of edges utilizes feature information designated by an operator.

D8. The indicia reading terminal of claim D1, wherein said indicia reading terminal for finding said representations of said edges utilizes edge detection image processing without utilizing any feature information designated by an operator.

D9. The indicia reading terminal of claim D1, wherein said indicia reading terminal for finding said representations of said edges utilizes feature information designated by an operator and edge detection image processing.

E1. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting at least a first light formation onto said article for determining dimension information of said article, said first light formation being projected onto said article within said field of view of said indicia reading terminal;
wherein said indicia reading terminal is operable in a spatial measurement mode of operation in which said indicia reading terminal determines dimensions of said article;
wherein said indicia reading terminal is in communication with an article database, the article database including dimension information for various candidate article types; and
wherein said indicia reading terminal is configured so that in said spatial measurement mode said indicia reading terminal determines one or two of width, length, or height dimensions of said article by way of image processing, and utilizes said article database for determining one or more of (a) an article type identifier; (b) an article volume value; and (c) missing dimension(s) of said article not determined by way of image processing.

F1. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting a first light formation and a second light formation onto said article for determining dimension information of said article, said first light formation and said second light formation being projected onto said article within said field of view of said indicia reading terminal;
wherein said indicia reading terminal is operable in a spatial measurement mode of operation in which said indicia reading terminal determines at least one of a width, length or height dimension of said article;
wherein said indicia reading terminal, when operating in said spatial measurement mode of operation processes a frame of image data including a representation of said article and determines a pixel distance between representations of said first and second light formations; and
wherein said indicia reading terminal, further in said spatial measurement mode of operation utilizes said pixel distance for determination of said at least one of a width, length, of height dimension of said article.

G1. A method for measuring a dimension of an article selected from the group consisting of a width, length and height of an article, said method comprising the steps of:
(a) providing in a hand held indicia reading terminal a light generating assembly that can project a pair of dimensioning light formations onto said article;
(b) configuring said hand held indicia reading terminal to include a spatial measurement mode of operation;
(c) activating said spatial measurement mode of operation;
(d) manually aligning said hand held indicia reading terminal relative to said article in such manner that said pair of formations are projected on said article in an orientation substantially parallel to a first edge of said article and substantially perpendicularly relative to a second edge of said article;
(e) actuating an actuator to capture a frame of image data including a representation of said article; and
(f) processing said frame of image data to determine a dimension of said article, said processing including processing to determine a pixel distance between representations of said first and second formations of said frame of image data.

G2. The method of claim G1, further including the step of providing an instruction manual including at least one of the instructions that (1) said terminal should be aligned substantially parallel to a first edge of said article and that (2) said terminal should be aligned substantially perpendicular to a second edge of said article, wherein said instruction manual is selected from the group consisting of a paper instruction manual, an electrically displayed instruction manual and a played audio recording instruction manual.

G3. The method of claim G1, wherein said manually aligning step precedes said actuating step.

H1. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting a first light formation and a second light formation onto said article for determining dimension information of said article, said first light formation and said second light formation being projected onto said article within said field of view of said indicia reading terminal, wherein light beams forming said first light formation and said second light formation are substantially parallel to one another but deviate from one another by a deviation angle of less than 5 degrees;
wherein said indicia reading terminal is operable in a spatial measurement mode of operation in which said indicia reading terminal determines at least one of a width, length or height dimension of said article;
wherein said indicia reading terminal, when operating in said spatial measurement mode of operation processes a frame of image data including a representation of said article and determines a pixel distance between representations of said first and second light formations;
wherein said indicia reading terminal, further in said spatial measurement mode of operation utilizes said determined pixel distance for determination of said at least one of a width, length, of height dimension of said article; and
wherein said indicia reading terminal, is further configured so that in said spatial measurement mode, said indicia reading terminal normalizes terminal to target distance dependent changes in said pixel distance resulting from said deviation angle so that determined dimensions of said article are substantially independent of said terminal to target distance.

H2. The indicia reading terminal of claim H1 wherein said deviation angle results from manufacturing tolerances.

I1. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting at least one light formation onto said article for determining dimension information of said article, said at least one light formation projected onto said article within said field of view of said indicia reading terminal, wherein a light beam forming said at least one light formation deviates from a parallel relationship with an imaging axis of said indicia reading terminal by deviation angle of less than 3 degrees;
wherein said indicia reading terminal is operable in a spatial measurement mode of operation in which said indicia reading terminal determines at least one of a width, length or height dimension of said article;
wherein said indicia reading terminal, when operating in said spatial measurement mode of operation processes a frame of image data including a representation of said article and determines a pixel position of a representation of said at least on light formation;
wherein said indicia reading terminal, further in said spatial measurement mode of operation utilizes said determined pixel position for determination of said at least one of a width, length, of height dimension of said article; and
wherein said indicia reading terminal, is further configured so that in said spatial measurement mode, said indicia reading terminal normalizes terminal to target distance dependent changes in said pixel position resulting from said deviation angle so that determined dimensions of said article are substantially independent of said terminal to target distance.

I2. The indicia reading terminal of claim I1 wherein said deviation angle results from manufacturing tolerances.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:

1. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting at least a first light formation onto said article for determining dimension information of said article, said first light formation being projected onto said article within said field of view of said indicia reading terminal;
wherein said indicia reading terminal is operable in a spatial measurement mode of operation in which said indicia reading terminal determines at least one of a width, length or height dimension of said article;
wherein said indicia reading terminal, when operating in said spatial measurement mode of operation processes a frame of image data including a representation of said article and determines a pixel position for a representation of said at least one formation; and
wherein said indicia reading terminal, further in said spatial measurement mode of operation utilizes at least one of setup data determined prior to said spatial measurement mode of operation being made active, and data determined utilizing said setup data, wherein said setup data includes pixel position data for representations of the first light formation at each of a first and second terminal to target distance.

2. The indicia reading terminal of claim 1, wherein said indicia reading terminal is configured to project first and second light formations onto said article.

3. The indicia reading terminal of claim 1, wherein said terminal is configured to project first and second formations onto said article, and wherein said setup data includes pixel position data for representations of said first and second light formations, at each of a first and second terminal to target distances.

4. The indicia reading terminal of claim 1, wherein said terminal is configured to project first and second light formations onto said article, and wherein said setup data includes pixel position data for representations of said first and second light formations, at each of a first and second terminal to target distances, and wherein said setup data further includes actual formation distances (the distance between the formations) at each of said first and second terminal to target distances.

5. The indicia reading terminal of claim 1, further including a display, wherein said indicia reading terminal is configured so that in said spatial measurement mode of operation said indicia reading terminal displays on said display a frame of image data being subjected to processing for determining measurement information, and further presents on said display indicators which may be moved by an operator to designate feature information of said frame of image data.

6. The indicia reading terminal of claim 1, wherein said indicia reading terminal is in communication with an article database, the article database including dimension information for various candidate article types, and wherein said indicia reading terminal is configured so that in said spatial measurement mode of operation said indicia reading terminal determines one or two of width, length, or height dimensions of said article by way of image processing, and utilizes said article database in for determining one or more of (a) an article type identifier; (b) an article volume value; and (c) missing dimension(s) of said article not determined by way of image processing.

7. An indicia reading terminal comprising:
an image sensor having a plurality of pixels formed in a plurality of rows and columns of pixels, wherein said indicia reading terminal has a field of view;
an imaging lens focusing an image of a article within said field of view onto said image sensor;
a light generating assembly projecting at least a first light formation onto said article for determining a distance of said indicia reading terminal to said article, said first light formation being projected onto said article within said field of view of said indicia reading terminal;
wherein said indicia reading terminal is operable in a spatial measurement mode of operation in which said indicia reading terminal determines a distance of said indicia reading terminal to said article;
wherein said indicia reading terminal, when operating in said spatial measurement mode of operation processes a frame of image data including a representation of said article and determines a pixel position for a representation of said at least one formation; and
wherein said indicia reading terminal, further while operating in said spatial measurement mode of operation to determine said distance of said indicia reading terminal to said article utilizes at least one of setup data determined prior to said spatial measurement mode of operation being made active, and data determined utilizing said setup data.

8. The indicia reading terminal of claim 7, wherein said indicia reading terminal is configured to project first and second light formations onto said article.

9. The indicia reading terminal of claim 7, further including a display, wherein said indicia reading terminal is configured so that in said spatial measurement mode of operation said indicia reading terminal displays on said display a frame of image data being subjected to processing for determining measurement information, and further presents on said display indicators which may be moved by an operator to designate edge positions of said frame of image data.

10. The indicia reading terminal of claim 7, wherein said indicia reading terminal is in communication with an article database, the article database including dimension information for various candidate article types, and wherein said indicia reading terminal is configured so that in said spatial measurement mode said indicia reading terminal determines one or two of width, length, or height dimensions of said article by way of image processing, and utilizes said article database in for determining one or more of (a) an article type identifier; (b) an article volume value; and (c) missing dimension(s) of said article not determined by way of image processing.

11. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting at least a first light formation onto said article for determining dimension information of said article, said first light formation being projected onto said article within said field of view of said indicia reading terminal;

wherein said indicia reading terminal is operable in a spatial measurement mode of operation in which said indicia reading terminal determines at least one of a width, length or height dimension of said article;

wherein said indicia reading terminal, when operating in said spatial measurement mode of operation processes a frame of image data including a representation of said article, determines a pixel position for a representation of said at least one light formation and finds representations of edges of said article; and wherein said indicia reading terminal, further in said spatial measurement mode of operation determines $p_n$, the pixel distance between said pixel position and one of (a) a pixel position corresponding to another light formation or (b) a reference pixel position, determines $P_n$, the pixel distance between said representations of edges of said article, and determines a dimension of said article selected from the group consisting of width, length, and height dimensions of said article utilizing said determined $p_n$, and $P_n$, values and $d_n$ where $d_n$ is an estimated present actual distance between said first light formation and (a) another light formation projected by said indicia reading terminal, and (b) a reference position.

12. The indicia reading terminal of claim 11, further including a display, wherein said indicia reading terminal is configured so that in said spatial measurement mode of operation said indicia reading terminal displays on said display a frame of image data being subjected to processing for dimensioning, and further presents on said display indicators which may be moved by an operator to designate edge positions of said frame of image data, wherein said indicia reading terminal in finding said representations of said edges reads said edge positions designated by said operator.

13. The indicia reading terminal of claim 11, wherein $d_n$ is a predetermined value based on design specifications for said indicia reading terminal.

14. The indicia reading terminal of claim 11, wherein $d_n$ is a calculated value calculated utilizing at least one of setup data recorded in a setup mode of operation and data determined utilizing said setup data.

15. The indicia reading terminal of claim 11, wherein said indicia reading terminal, when operating in said spatial measurement mode of operation applies the formula $D=(P_n*d_n)/p_n$ where D is the dimension being determined.

16. The indicia reading terminal of claim 11, wherein said indicia reading terminal, for finding said representations of edges, reads edge positions that have been designated by an operator of said indicia reading terminal.

17. The indicia reading terminal of claim 11, wherein said indicia reading terminal, for finding said representations of edges utilizes feature information designated by an operator.

18. The indicia reading terminal of claim 11, wherein said indicia reading terminal for finding said representations of said edges utilizes edge detection image processing without utilizing any feature information designated by an operator.

19. The indicia reading terminal of claim 11, wherein said indicia reading terminal for finding said representations of said edges utilizes feature information designated by an operator and edge detection image processing.

20. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting at least a first light formation onto said article for determining dimension information of said article, said first light formation being projected onto said article within said field of view of said indicia reading terminal;
wherein said indicia reading terminal is operable in a spatial measurement mode of operation in which said indicia reading terminal determines dimensions of said article;
wherein said indicia reading terminal is in communication with an article database, the article database including dimension information for various candidate article types; and
wherein said indicia reading terminal is configured so that in said spatial measurement mode said indicia reading terminal determines one or two of width, length, or height dimensions of said article by way of image processing, and utilizes said article database for determining one or more of (a) an article type identifier; (b) an article volume value; and (c) missing dimension(s) of said article not determined by way of image processing.

21. An indicia reading terminal of claim 20 wherein said indicia reading terminal, further in said spatial measurement mode of operation utilizes said article database for determining an article type identifier.

22. An indicia reading terminal of claim 20 wherein said indicia reading terminal, further in said spatial measurement mode of operation utilizes said article database for determining an article volume value without determining each of a width, length and height dimension of the article by way of image processing.

23. An indicia reading terminal of claim 20 wherein said indicia reading terminal, further in said spatial measurement mode of operation utilizes said article database for determining missing dimension(s) of said article not determined by way of image processing.

24. An indicia reading terminal of claim 20 wherein said article database correlates dimension information for candidate article types to at least one of article type identifiers and article type volumes.

25. An indicia reading terminal comprising:
an image sensor having a plurality of pixels formed in a plurality of rows and columns of pixels, wherein said indicia reading terminal has a field of view;
an imaging lens focusing an image of an article within said field of view onto said image sensor;
a light generating assembly projecting a first light formation and a second light formation onto said article for determining dimension information of said article, said first light formation and said second light formation being projected onto said article within said field of view of said indicia reading terminal;
wherein said indicia reading terminal is operable in a spatial measurement mode of operation in which said indicia reading terminal determines at least one of a width, length or height dimension of said article;
wherein said indicia reading terminal, when operating in said spatial measurement mode of operation processes a frame of image data including a representation of said article and determines a pixel distance between representations of said first and second light formations; and
wherein said indicia reading terminal, further in said spatial measurement mode of operation utilizes said pixel distance for determination of said at least one of a width, length, of height dimension of said article.

26. An indicia reading terminal comprising:
an image sensor having a plurality of pixels formed in a plurality of rows and columns of pixels, wherein said indicia reading terminal has a field of view;

an imaging lens focusing an image of an article within said field of view onto said image sensor;

a light generating assembly projecting at least a first light formation onto said article for determining dimension information of said article, said first light formation being projected onto said article within said field of view of said indicia reading terminal;

wherein said indicia reading terminal is operable in a spatial measurement mode of operation in which said indicia reading terminal determines at least one of a width, length or height dimension of said article;

wherein said indicia reading terminal, when operating in said spatial measurement mode of operation processes a frame of image data including a representation of said article and determines a pixel position for a representation of said at least one formation; and wherein said indicia reading terminal is configured so that in said spatial measurement mode of operation said indicia reading terminal displays on said display a frame of image data being subjected to processing for determining measurement information, and further presents on said display indicators which may be moved by an operator to designate feature information of said frame of image data.

27. The indicia reading terminal of claim 26, wherein said indicia reading terminal is configured to project first and second light formations onto said article.

28. The indicia reading terminal of claim 26, wherein said terminal is configured to project first and second formations onto said article, and wherein said setup data includes pixel position data for representations of said first and second light formations, at each of a first and second terminal to target distances.

29. An indicia reading terminal comprising:

an image sensor having a plurality of pixels formed in a plurality of rows and columns of pixels, wherein said indicia reading terminal has a field of view;

an imaging lens focusing an image of an article within said field of view onto said image sensor;

a light generating assembly projecting at least a first light formation onto said article for determining dimension information of said article, said first light formation being projected so that said first light formation does not extend size (width, length or height) of said article, said first light formation being projected onto said article within said field of view of said indicia reading terminal;

wherein said indicia reading terminal is operable in a spatial measurement mode of operation in which said indicia reading terminal determines at least one of a width, length or height dimension of said article;

wherein said indicia reading terminal, when operating in said spatial measurement mode of operation processes a frame of image data including a representation of said article and determines a pixel position for a representation of said at least one formation; and wherein said indicia reading terminal, further in said spatial measurement mode of operation utilizes at least one of setup data determined prior to said spatial measurement mode of operation being made active, and data determined utilizing said setup data, wherein said setup data includes pixel position data for representations of the first light formation at each of a first and second terminal to target distance.

* * * * *